United States Patent

[11] 3,583,599

| [72] | Inventor | Steve Spisak<br>Elyria, Ohio |
|---|---|---|
| [21] | Appl. No. | 769,180 |
| [22] | Filed | Oct. 21, 1968 |
| [45] | Patented | June 8, 1971 |
| [73] | Assignee | TRW Inc.<br>Cleveland, Ohio |

[54] APPARATUS FOR FEEDING A PLURALITY OF SMALL PARTS
2 Claims, 7 Drawing Figs.

[52] U.S. Cl. ................................................. 221/68,
221/278, 302/2R
[51] Int. Cl. ............................................. B65q 59/06
[50] Field of Search .......................................... 198/33 R,
68; 133/5; 221/180, 292, 252, 68, 264, 268, 278;
302/2, 28

[56] References Cited
UNITED STATES PATENTS

| 1,682,911 | 9/1928 | Jorgensen | 221/264X |
|---|---|---|---|
| 3,185,343 | 5/1965 | Braendel | 221/264X |
| 3,275,191 | 9/1966 | MacDonald | 221/264X |
| 3,292,819 | 12/1966 | Ford | 221/264X |
| 3,297,199 | 1/1967 | Law | 221/268X |
| 3,339,799 | 9/1967 | Spisak | 221/264X |
| 3,439,834 | 4/1969 | Carter | 221/264X |
| 3,467,236 | 9/1969 | Dhanda | 221/292X |

*Primary Examiner*—Evon C. Blunk
*Assistant Examiner*—W. Scott Carson
*Attorneys*—Philip E. Parker, James R. O'Connor, John Todd, Hall & Houghton and Gordon Needleman ABSTRACT: A welding system is capable of rapidly welding two studs simultaneously to a workpiece. A feeding system supplies two studs preferably simultaneously to two welding tools which effect the welds, with the feeding system receiving the studs from a single track and supplying them through two separate passages to the two tools by means of a single escapement mechanism. The escapement includes a stop member for holding one stud in one passage while another stud is being fed to the second passage, after which both studs are blown substantially simultaneously through the passages to the two welding tools which then weld the studs to the workpiece.

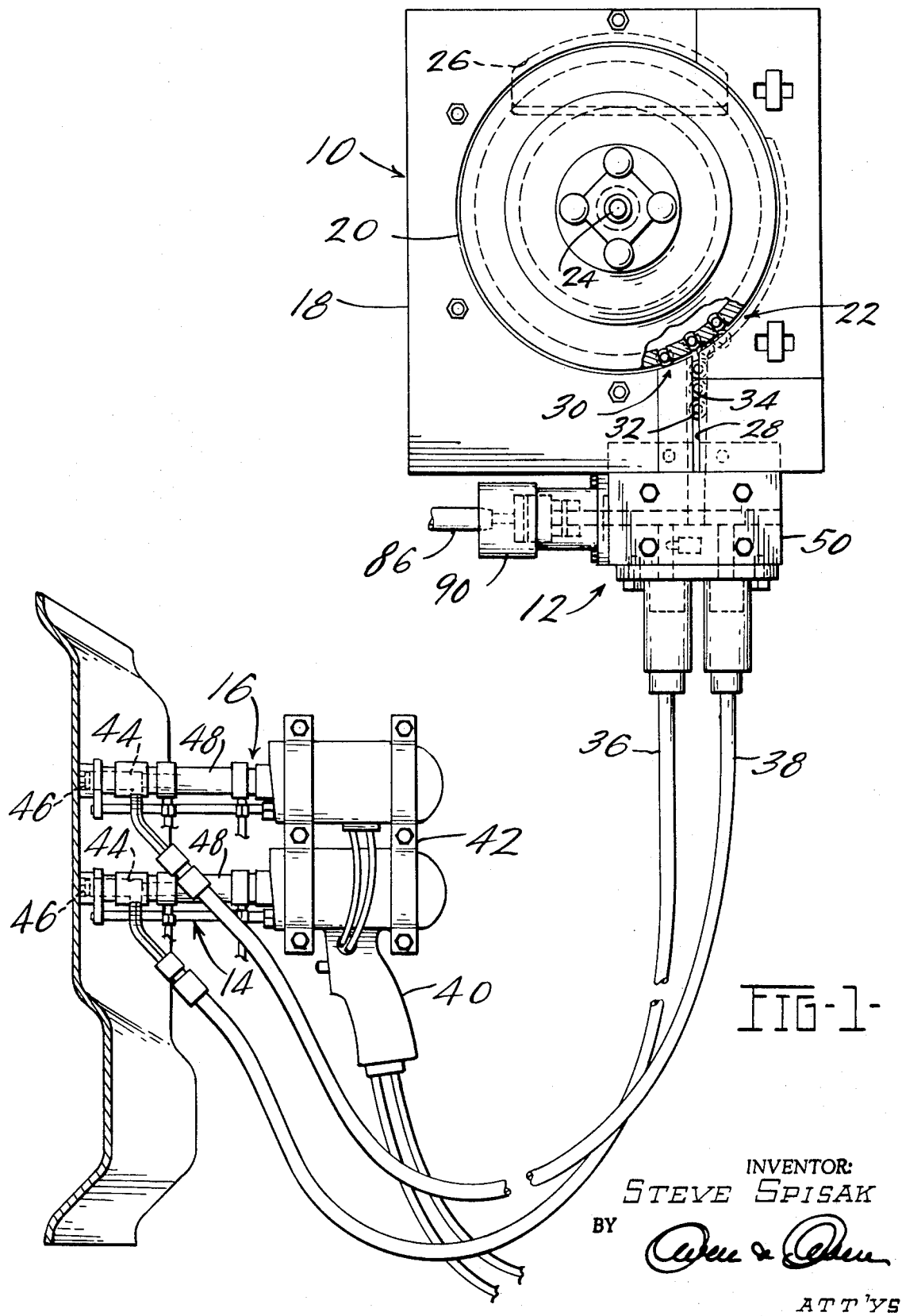

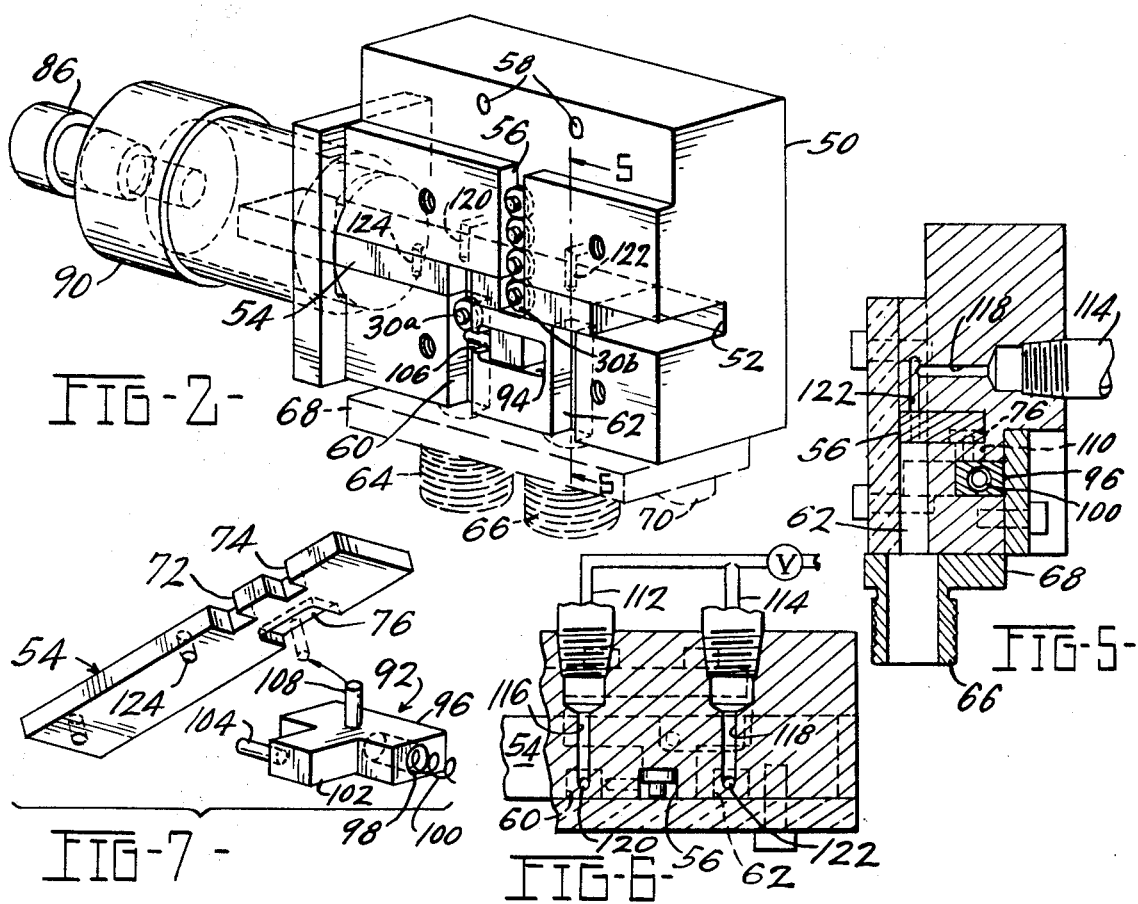
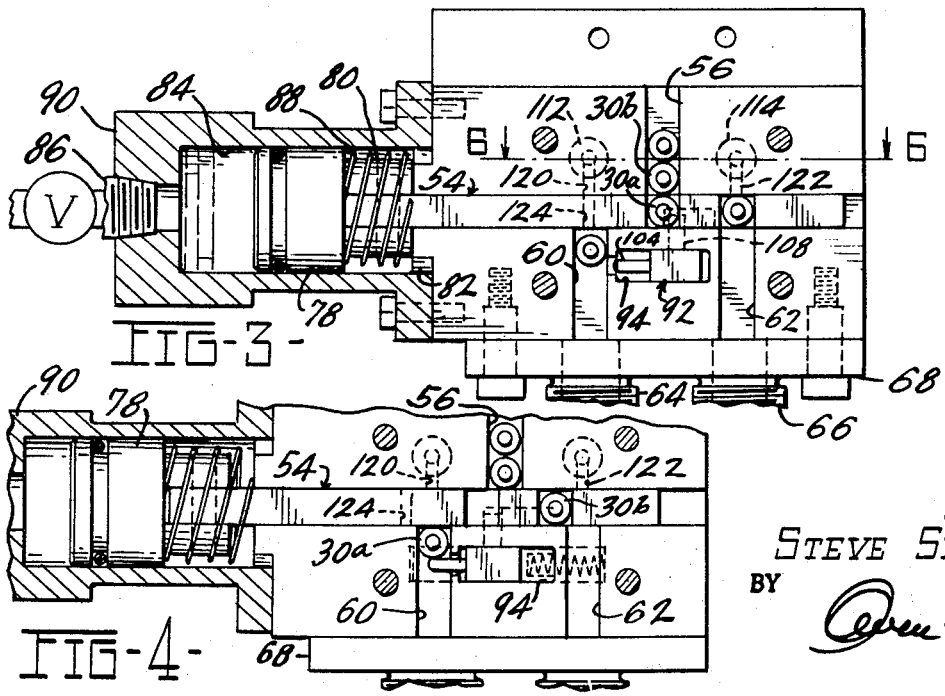

APPARATUS FOR FEEDING A PLURALITY OF SMALL PARTS

This invention relates to a welding system and more particularly to a feeding system for supplying a plurality of studs to a plurality of stud-welding tools.

Small weldable studs are continually finding widespread applications. In many instances, it has been found advantageous to use a plurality of welding tools to weld a plurality of studs to a particular workpiece rather than using a single welding tool to weld the same number of studs sequentially to the workpiece. By way of example, with two portable stud-welding tools, the tools can be used to weld pairs of small T-shaped studs at predetermined locations along a surface of an automobile, each pair being welded substantially simultaneously. Straps are then affixed between each pair to carry wiring. Also, a pair of stud-welding tools can be used in a fixed position as a welding machine with workpieces then fed under the tools which weld two studs in predetermined locations to each of the workpieces.

A plurality of studs or other small parts previously have been fed to a plurality of tools as shown and described in my copending application Ser. No. 641,574 now U.S. Pat. No. 3,526,743. Heretofore, apparatus for feeding studs or small parts in this manner has required either separate tracks and separate sources of studs or a single source and track which branches into a plurality of additional tracks. The studs are then received in an escapement from the plurality of tracks and supplied to the tools through a plurality of passages. However, in such instances, there has been a tendency for the studs or parts to jam when branching from the single supply track to the branch tracks.

The instant invention provides apparatus for feeding small parts or studs from a single track directly through an escapement into a plurality of supply passages, each of which feeds the parts to a single tool. With this arrangement, there is no possibility of the studs jamming in the track any more than in a system in which a single part is fed from a supply track through a feed passage to a single tool.

It is, therefore, a principal object of the invention to provide a welding system in which studs are fed to stud-welding tools from feed passages connected to an escapement which receives the studs from a single supply track and supply source.

Another object of the invention is to provide a system for feeding parts to a plurality of feed passages from a single supply passage.

Still another object of the invention is to provide apparatus for simultaneously feeding two studs through separate feed passages to two separate welding tools with a single escapement, a single supply track, and a single supply source.

Other objects and advantages of the invention will be apparent from the following detailed description of a preferred embodiment thereof, reference being made to the accompanying drawings, in which:

FIG. 1 is an overall view in elevation of a stud welding system embodying the invention;

FIG. 2 is a view in perspective of an escapement employed in the welding system, and shown in one position;

FIG. 3 is a front view, with parts in section, of the escapement of FIG. 2, and shown in a second position;

FIG. 4 is a fragmentary view similar to FIG. 3 with the escapement shown in a third, intermediate position;

FIG. 5 is a sectional view taken along the line 5-5 of FIG. 2;

FIG. 6 is a fragmentary, sectional view taken along the line 6-6 of FIG. 3; and

FIG. 7 is an exploded view in perspective of an escapement shuttle and stop member employed in the escapement.

Referring to FIG. 1, a welding system embodying the invention includes a supply of parts or studs indicated at 10, an escapement 12, and two welding tools 14 and 16. The source 10 of parts or studs can be of any suitable type and, as shown, is of a type disclosed in a copending application of Don E. Ehrlich, Ser. No. 723,852, filed Apr. 24, 1968. The supply or source includes a baseplate 18 which preferably is positioned at an angle to the vertical and a hollow rotating member 20 having a notched annular edge, as shown at 22, with the member rotatably supported relative to the baseplate by a shaft 24 rotated by suitable means (not shown). Studs are supplied to the member 20 through a rear upper opening 26 and, when properly oriented and positioned, pass through the notches in the edge 22 and into a supply track 28. Studs 30 are located in the track 28 with heads 32 lying against the baseplate 18 and with stems 34 projecting forwardly into a slotted portion of the track.

The escapement 12 feeds the studs 30 through feed passages 36 and 38 and to the tools 14 and 16. The tools 14 and 16 are basically the same except for 358,736, handle 40 only for the tool 14, the tools being mounted in fixed relationship by bracket members 42. The studs 30 are fed through the passages 36 and 38 into chambers 44 at the front ends of the tools from which the studs are moved forwardly into chucks 46 by plungers operated by air cylinders 48. The tools, while shown as hand operated, can also be mounted in stationary positions as part of a welding machine, for example, as shown in my copending application Ser. No. 641,574, filed May 26, 1967, now U.S. Pat. No. 3,526,743 with the details of the chambers and chucks being described more fully in my copending application, Ser. No. 358,736, filed Apr. 10, 1964, now U.S. Pat. No. 3,525,846.

In detail, the escapement 12 of FIGS. 2—7 includes a block or body 50 having a guide channel or groove 52 therein in which a shuttle or transfer slide 54 reciprocates. The escapement body also forms a supply track extension 56 which communicates with the track 28 when assembled with the mounting plate 18 by fasteners received in fastener openings 58. The body further forms two feed passage extensions 60 and 62 which preferably are symmetrically located with respect to the supply track 56. The extensions communicate with the feed passages 36 and 38 through suitable fittings 64 and 66 located on a mounting plate 68 which is attached by fasteners 70 to the bottom of the escapement body 50.

The shuttle 54 has a pair of transfer notches or openings 72 and 74 in the upper edge portion thereof which are spaced apart a distance equal to the distance between the supply track 56 and each of the feed passages 60 and 62. With this arrangement, when either of the openings 72 or 74 is in communication with the supply track 56, the other of the openings 72 or 74 will be in communication with one of the feed passages 60 and 62. The slide 54 also has a lower recess or opening 76 which is longer than either of the openings 72 or 74, the purpose of which will be discussed subsequently.

The shuttle 54 is moved by a piston 78 to which the shuttle 54 is connected by a clevis 80 which also forms a positive stop in the forward direction of the shuttle 54 by abutting a projection 82 formed by the body 50. The piston 78 is located in an air cylinder 84 to which air is supplied at the blind end of the piston by a passage or line 86 with the piston 78 being urged toward the passage 86 by a return spring 88. An end wall 90 of the cylinder 84 forms a positive stop for the shuttle 54 during movement toward the blind end of the cylinder. The extremity of the shuttle 54 in its movement toward the rod or clevis end of the piston 78 or toward the right, as shown, is illustrated in FIG. 3, while the extremity of the movement of the shuttle 54 toward the blind end of the cylinder or toward the left, is illustrated in FIG. 2.

A T-shaped stop member 92 of the escapement is carried in a chamber 94 formed in the body 50. As shown in FIG. 7, the stop member 92 includes a crossbar portion 96 having a passage 98 therein carrying a return spring 100 which abuts one end of the chamber 94 and urges the stop member 92 toward the left, as shown in FIGS. 2—4. The stop member 92 further includes a stem 102 from which a stop pin 104 projects transversely, extending through a notch 106 and into the feed passage 60 when the stop member is in the left-hand position. A drive pin 108 extends upwardly from the crossbar portion 96 through a slot 110 (FIG. 5) of the body 50, and into the elongate recess 76 in the shuttle 54. The stop member 92 is normally maintained in its left-hand position with the stop pin 104 projecting into the passage 60 except when the left end of the recess 76 (FIG. 7) engages the pin 108 and forces the stop member 92 to the right of the chamber 94, overcoming the force of the spring 100. The end of the recess 76 of the shuttle 54, however, does not engage the pin 108 until the right-hand notch 74 is almost in alignment with the right-hand feed passage 62. The position of engagement is shown in FIG. 4.

The studs are blown through the feed passages 60 and 62 to the tools after the shuttle has deposited a stud in the left-hand passage 60 and then has moved the next stud in the notch 74 to the right-hand passage. For this purpose, air lines 112 and 114 are threaded into the rear of the escapement body 50 and communicate with horizontal passages 116 and 118 in the body. These connect with vertical passages 120 and 122 which are aligned with the feed passages 60 and 62. The shuttle 54 also has a transverse passage 124 which is in alignment with the vertical passage 120 when the shuttle is in the right-hand position, as shown in FIG. 3, to enable air to pass therethrough. Flow of air to the cylinder 84 and the lines 120 and 122 can be controlled by suitable valves which are schematically shown.

In the operation of the overall apparatus, air is applied to the cylinder through the line 86 with the shuttle 54 being in the right-hand position, as shown in FIG. 3. When studs in the welding tools have been welded, the air valve is closed and the air vented to enable the return spring 88 to move the piston 78 to the left against the rear wall 90. A stud designated 30a in FIG. 3, received in the notch 72 from the track 56, is then moved to the left and into alignment with the feed passage 60, as shown in FIG. 2. As the shuttle 54 moves to the left, the edge of the recess 76 moves out of engagement with the pin 108, enabling the spring 100 to move the stop member 92 to the left and move the pin 104 into the passage 60. The pin 104 moves in this manner before the notch 72 and the stud 30a move into alignment with the passage 60. Consequently, when the notch is aligned with the passage, the stud 30a drops into position against the stop pin 104 and there remains until the pin is removed.

After the shuttle 54 moves to the left-hand position of FIG. 2, air is again applied to the cylinder through the line 86. A stud 30b above the stud 30a, in FIG. 3, has now dropped into the notch 74 which was aligned with the track 56 when the notch 72 was aligned with the feed passage 60. This stud is then carried by the shuttle toward the right and past the position of FIG. 4, into alignment with the right-hand feed passage 62. At the time the notch 74 reaches alignment with the passage 62, the stop pin has been retracted from the passage 60 and air is then applied through the lines 112 and 114, the passages 116 and 118, the vertical passages 120 and 122, and the transverse passage 124 in the shuttle 54 to simultaneously blow the two studs 30a and 30b down the feed passages 60 and 62, the tubes 36 and 38, and to the chucks of the welding tools 14 and 16.

During the short time required for the back and forth movement of the shuttle 54 to feed the studs to the passages and then blow them to the tools, the welding tools can be moved to the next workpiece or, if stationary, the next workpiece can be moved into position relative to the tools. Hence, it is usually preferred to feed the studs substantially simultaneously to the tools rather than feeding the studs one at a time and welding them one at a time alternately.

Various modifications of the above-described embodiment of the invention will be apparent to those skilled in the art and it is to be understood that such modifications can be made without departing from the scope of the invention, it being understood that the embodiment is shown primarily for illustration and not limitation.

I claim:

1. Apparatus for feeding small parts from one track alternately to two feed passages comprising an escapement body, a guide channel formed in said body, means forming a supply track communicating with an intermediate part of said channel, means forming first and second spaced passages communicating with said channel on the side thereof opposite said track, a transfer slide mounted for reciprocatory movement in said channel, said slide having two spaced openings, means for reciprocating said slide to move one of said openings from communication with the first of said passages to communication with said track while moving the other of said openings from communication with said track to communication with the second of said passages, a stop member for holding a first part in the first passage while a second part is moved in the other opening of the transfer slide from the track to the second passage, the stop member carried by the escapement body associated with the slide and movable thereby when the second part is moved to the second passage whereby both parts will be released simultaneously for movement along the passages simultaneously.

2. Apparatus for feeding small parts from one track alternately to two feed passages comprising an escapement body, a guide channel formed in said body, means forming a supply track communicating with an intermediate part of said channel, means forming two spaced passages communicating with said channel on the side thereof opposite said track, said passages being spaced equal distances from said track, a transfer slide mounted for reciprocatory movement in said channel, said slide having two openings spaced apart a distance equal to the distance between each of said passages and said track, means for reciprocating said slide to move one of said openings from communication with one of said passages to communication with said track while moving the other of said openings from communication with said track to communication with the other of said passages, a stop member for holding a part in said one passage in a position near the transfer slide while a second of the parts in the other opening of the transfer is moved from the track to the other passage, the stop member carried by the escapement body for movement between a position spaced from said one passage and a position in which said stop member projects into said one passage and projecting means mounted in fixed relationship with respect to the stop member and the transfer slide having an elongate recess therein for receiving the projecting member and for moving said stop member from the position in said one passage to the position spaced from said one passage when said slide moves the other opening therein from the position in communication with said track to the position in communication with said other passage.